(12) United States Patent
van Iperen

(10) Patent No.: US 7,862,263 B2
(45) Date of Patent: Jan. 4, 2011

(54) CUTTING TOOL WITH MULTIPLE FLUTES DEFINING DIFFERENT PROFILES, AND METHOD

(75) Inventor: Jan-Willem van Iperen, Lottum (NL)

(73) Assignee: Seco Tools AB, Fagersta (SE)

( * ) Notice: Subject to any disclaimer, the term of this patent is extended or adjusted under 35 U.S.C. 154(b) by 655 days.

(21) Appl. No.: 11/748,603

(22) Filed: May 15, 2007

(65) Prior Publication Data

US 2008/0193232 A1  Aug. 14, 2008

(30) Foreign Application Priority Data

Feb. 8, 2007 (SE) .................................. 0700317

(51) Int. Cl.
B23C 5/12 (2006.01)
(52) U.S. Cl. .............................. 407/60; 407/61; 407/54
(58) Field of Classification Search .................. 407/53, 407/54, 55, 60, 61, 62; 408/204
See application file for complete search history.

(56) References Cited

U.S. PATENT DOCUMENTS

| | | | | |
|---|---|---|---|---|
| 2,188,631 A | * | 1/1940 | Kraus | 408/59 |
| 3,548,687 A | * | 12/1970 | Holloway | 408/206 |
| 4,034,452 A | | 7/1977 | Edming | |
| 4,182,587 A | * | 1/1980 | Striegl | 407/113 |
| 4,194,862 A | * | 3/1980 | Zweekly | 408/224 |
| 4,265,574 A | * | 5/1981 | Eckle | 408/188 |
| 4,411,563 A | * | 10/1983 | Moon | 407/54 |
| 4,564,321 A | * | 1/1986 | Kondo et al. | 407/36 |
| 4,812,087 A | * | 3/1989 | Stashko | 407/42 |
| 4,927,303 A | * | 5/1990 | Tsujimura et al. | 408/223 |
| 5,314,272 A | * | 5/1994 | Kubota | 408/224 |
| 5,908,269 A | | 6/1999 | Cox | |
| 5,944,456 A | * | 8/1999 | Shirley et al. | 407/42 |
| 5,988,956 A | * | 11/1999 | Omi et al. | 408/204 |
| 6,149,355 A | | 11/2000 | Fouquer et al. | |
| 6,164,877 A | | 12/2000 | Kamata et al. | |
| 6,200,078 B1 | * | 3/2001 | Kubota | 409/74 |
| 6,257,810 B1 | * | 7/2001 | Schmitt | 409/66 |

(Continued)

FOREIGN PATENT DOCUMENTS

DE    4010075 A1 * 10/1991

(Continued)

OTHER PUBLICATIONS

International Search Report from corresponding International Application No. PCT/SE2008/050039.

(Continued)

Primary Examiner—Boyer D. Ashley
Assistant Examiner—Sara Addisu
(74) Attorney, Agent, or Firm—WRB-IP LLP

(57) ABSTRACT

A cutting tool having multiple cutting edges includes a tool body having a longitudinal axis, a first cutting edge including a first leading edge that defines a first profile when rotated about the longitudinal axis, and a second cutting edge including a second leading edge that defines a second profile when rotated about the longitudinal axis, the first and second profiles being different from each other and being adapted to cut a workpiece in succession. A method is also disclosed.

21 Claims, 5 Drawing Sheets

U.S. PATENT DOCUMENTS

| | | |
|---|---|---|
| 6,322,296 B1 | 11/2001 | Wetli et al. |
| 6,488,454 B1 | 12/2002 | Ahn et al. |
| 6,869,259 B2 | 3/2005 | Lebkuechner |
| 7,007,382 B2 | 3/2006 | Mantel |

FOREIGN PATENT DOCUMENTS

| | | | |
|---|---|---|---|
| DE | 4121289 | A1 | 1/1992 |
| DE | 20007664 | U1 | 8/2000 |
| FR | 2554746 | A1 | 5/1985 |

OTHER PUBLICATIONS

NUMROTOplus: The all-round tool grinding package for today's and tomorrow's needs.

Official Action from corresponding Swedish Patent application No. 0700317-1.

* cited by examiner

CUTTING TOOL WITH MULTIPLE FLUTES DEFINING DIFFERENT PROFILES, AND METHOD

BACKGROUND AND SUMMARY

The present invention relates to cutting tools and, more particularly, to cutting tools with multiple flutes defining different profiles.

In machining operations such as milling, it is frequently necessary to form a plurality of shapes such as grooves, chamfers, and the like in a workpiece. This can be done in a plurality of operations, often with different tools, which can be time- and resource-consuming. Often, dedicated tools with cutting edges provided to form the desired shapes in the workpiece are provided. For example, dedicated tools with specific shapes are often used in forming root slots in Titanium disks as used in the compressor section of a turbine. Dedicated tools are also often employed in machining complex shapes such as when machining Ultra High Density Polyethylene (UHDPE).

A drawback of such tools is that substantial forces are generated as the cutting edges cut through the workpiece. The high forces can deform the tool and generate substantial heat, which heat can result in thermal expansion or deformation of the tool and the workpiece, leading to inaccurate cutting or formation of burrs which must be removed in a subsequent operation.

It is desirable to provide a cutting tool that is useful for forming complex shapes yet can do so without the need for generating high forces and can minimize thermal expansion of tool and workpiece during machining.

In accordance with an aspect of the present invention, a one-piece cutting tool having multiple flutes comprises a tool body having a longitudinal axis, a first flute provided in the body and comprising a first leading edge that defines a first profile when rotated about the longitudinal axis, and a second flute provided in the body and comprising a second leading edge that defines a second profile when rotated about the longitudinal axis, the first and second profiles being different from each other and being adapted to cut a workpiece in succession.

A cutting tool having multiple cutting edges can comprise a tool body having a longitudinal axis, a first cutting edge comprising a first leading edge that defines a first profile when rotated about the longitudinal axis, and a second cutting edge comprising a second leading edge that defines a second profile when rotated about the longitudinal axis, the first and second profiles being different from each other and being adapted to cut a workpiece in succession.

In accordance with another aspect of the present invention, a method of machining a workpiece comprises rotating a cutting tool having multiple flutes about a longitudinal axis of the tool. The method also comprises removing a first volume of material from the workpiece with a first leading edge of a first flute of the cutting tool, the first leading edge defining a first profile relative to the longitudinal axis of the cutting tool, and removing a second volume of material from the workpiece with a second leading edge of a second flute of the cutting tool, the second leading edge defining a second profile relative to the longitudinal axis of the cutting tool, the first and second profiles being different from each other, the first and second leading edges removing the first and the second volumes of material from the workpiece in succession.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
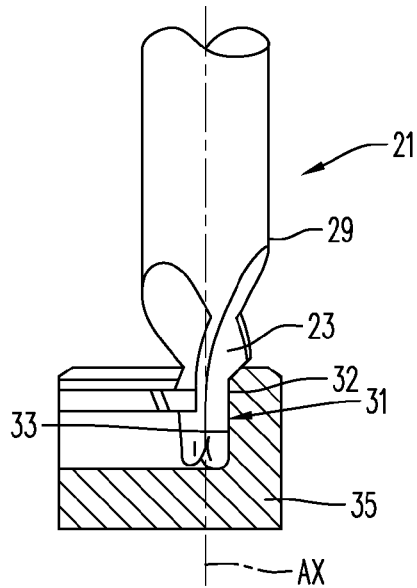
FIGS. 1A, 1B, and 1C are side views of a cutting tool in different rotational positions according to an embodiment of the present invention.
Figure 1B:
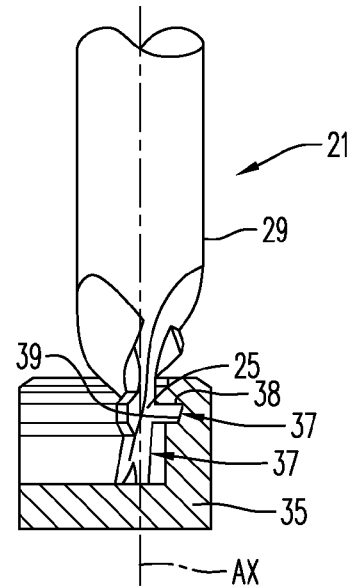
Figure 1C:
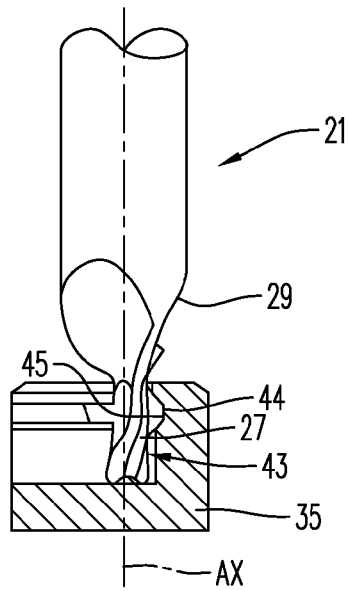

A cutting tool 21 is shown in FIG. 1A-1C having at least two flutes, here shown having three flutes 23, 25, and 27. The cutting tool 21 includes a tool body 29 having a longitudinal axis AX. The flutes 23, 25, and 27 are provided in the body 29 of the cutting tool 21.

As seen in FIG. 1A, a first flute 23 comprises a first leading edge 31 that defines a first profile 32 for forming a first shape 33 in a workpiece 35, the first shape corresponding to the first profile, when the first leading edge is rotated about the longitudinal axis AX. For purposes of the present application, the "profile" of the leading edge of a flute will be defined as that portion of the leading edge that performs a cutting operation to form a particular shape, i.e., a working portion of the leading edge. A second flute 25 comprises a second leading edge 37 that defines a second profile 38 for forming a second shape 39 in the workpiece as seen in FIG. 1B, the second shape corresponding to the second profile, when the second leading edge is rotated about the longitudinal axis AX. In the embodiment of FIGS. 1A-1C, a third flute 27 is provided and comprises a third leading edge 43 that defines a third profile 44 for forming a third shape 45 in the workpiece as seen in FIG. 1C, the third shape corresponding to the third profile, when the third leading edge is rotated about the longitudinal axis AX.

The first, second, and third profiles, 32, 38, and 44 and the first, second, and third shapes 33, 39, and 45 formed thereby, respectively, are different from each other. The leading edge of each flute is generally substantially longer than the profile or working portion of the flute that forms the first shape and, thus, cutting forces are generally applied only along the shorter, working portion of the flute, as opposed to along the entire length of the flute. For example, as seen in FIG. 1B, the working portion or profile 38 of the second leading edge 37 defines only a relatively minor portion of the length of the second leading edge. As a result, the cutting forces on the cutting edges have a reduced influence on the precision of the cutting process. In addition, less heat is generated than when cutting forces are applied along an entire length of the cutting edge, and thermal expansion of the workpiece and the tool are minimized, thereby tending to improve accuracy and reduce deviations. This tends, as well, to result in reduced burr formation which, in turn, reduces the amount of finishing work needed and reduces scrap resulting from unsuccessful attempts to remove burrs. Ordinarily, each leading edge will cut the workpiece to form a shape in such a manner that cutting forces on each leading edge will be substantially equal, even though the particular shapes formed are different. Each flute does not necessarily remove the same amount of material from a workpiece as every other flute on the tool. Ordinarily, each leading edge will cut the workpiece to form a shape in such a manner that cutting forces on each leading edge are divided among the leading edges in such a manner that formation of burrs is avoided.

Figure 1D:
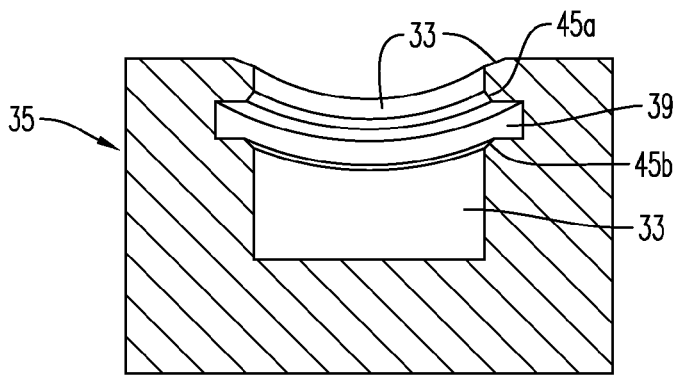
FIGS. 1D and 1E are cross-sectional views of a workpiece machined by a cutting tool of the type illustrated in FIGS. 1A, 1B, and 1C.
Figure 1E:
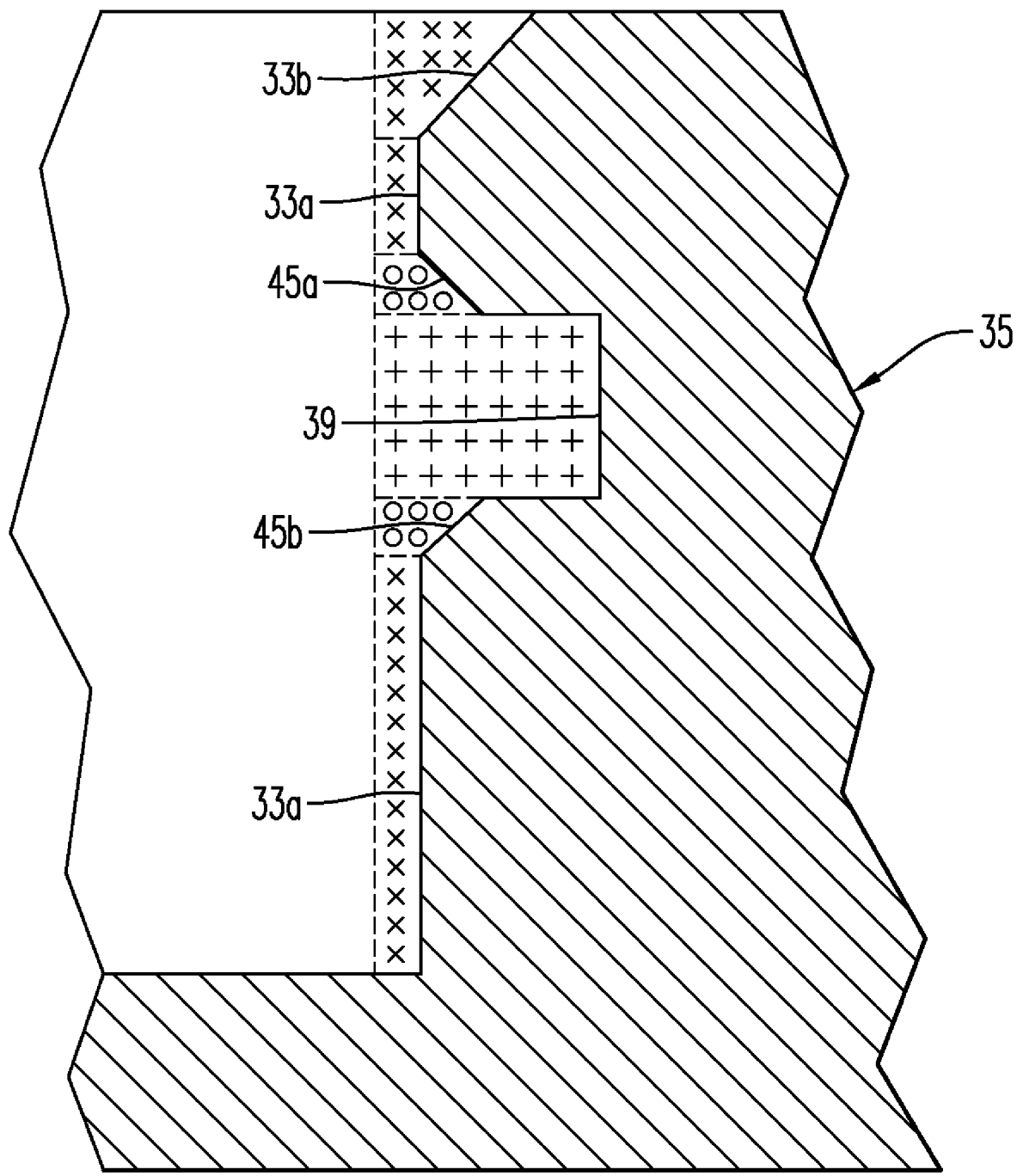

The first, second, and third profiles 32, 38, and 44 on the first, second, and third leading edges 31, 37, and 43 are able to form an overall shape such as that seen in FIGS. 1D and 1E. As seen in FIG. 1E, the first leading edge 31 cuts away a shape 33 illustrated by "x" marks, including the vertical internal diameter 33a of the shape and a top chamfer 33b. The second leading edge 37 cuts away a groove shape 39 illustrated in FIG. 1E as "+" marks, and the third leading edge 43 cuts away a shape 45 illustrated by "○" marks, including chamfers 45a and 45b at the top and bottom of the groove shape 39.

The flutes 23, 25, and 27 in the embodiment of FIGS. 1A-1C are helical flutes. The flutes in a cutting tool need not necessarily be helical, as seen in the embodiment shown in FIGS. 2A-2D. In the embodiment shown in FIGS. 2A-2D, the surfaces of the flutes are substantially flat and substantially parallel to the longitudinal axis AX.

Figure 2A:
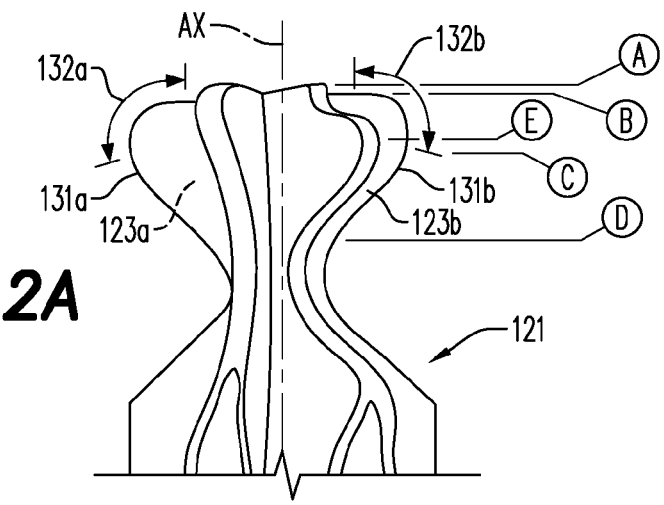
FIGS. 2A, 2B, and 2C are side views of a cutting tool in different rotational positions according to another embodiment of the present invention.
Figure 2B:
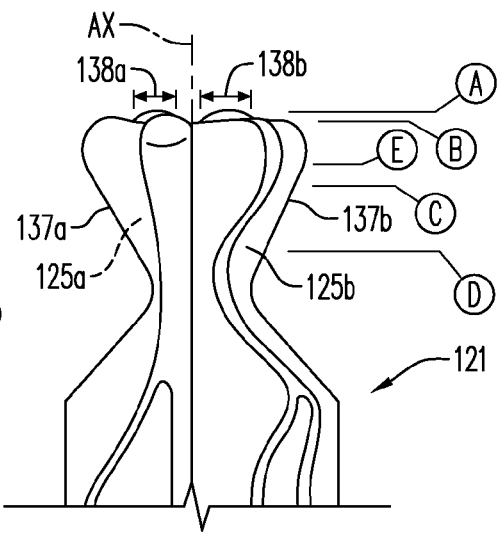
Figure 2C:
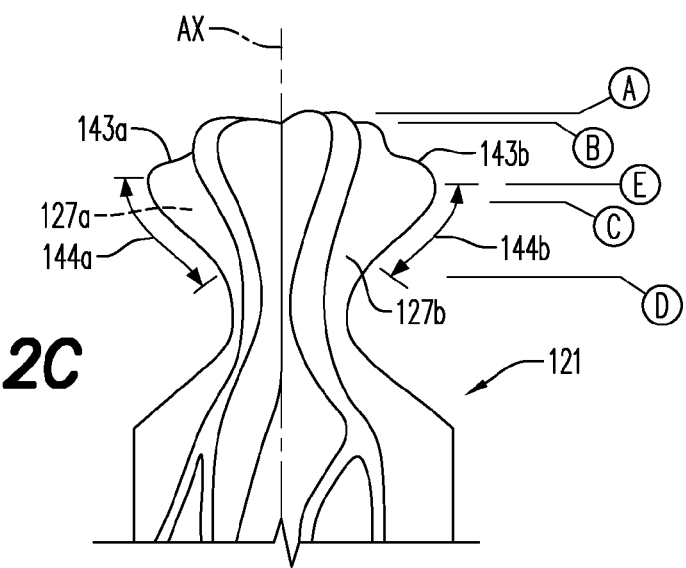
Figure 2D:
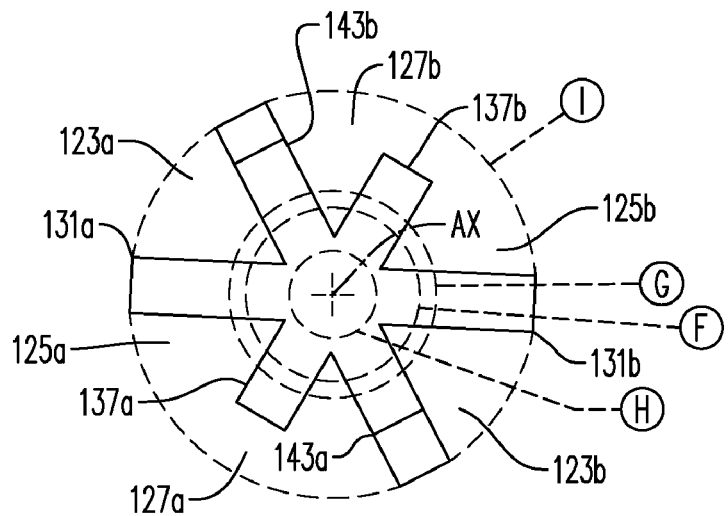
FIG. 2D is an end view of the cutting tool of FIGS. 2A, 2B, and 2C.

As seen in the embodiment of the cutting tool 121 shown in FIGS. 2A-2D, the cutting tool can include a group, seen in profile in FIG. 2A, comprising a first and a second first flute 123a and 123b, which can be identical, and a group, seen in profile in FIG. 2B, comprising a first and a second flute 125a and 125b, which can be identical. Other embodiments (not shown) can have third, fourth, fifth, etc. first and second flutes, which can be identical to the first and second first and second flutes. The embodiment shown in FIGS. 2A-2D, also includes a group, seen in profile in FIG. 2C, comprising a first and a second third flute 127a and 127b, which can be identical to each other. Other embodiments (not shown) can have third, fourth, fifth, etc. first, second, third, etc. flutes. The point is that there is not necessarily a limit to the number of flute groups or flutes in a flute group that can be provided on a cutting tool.

Figure 2E:
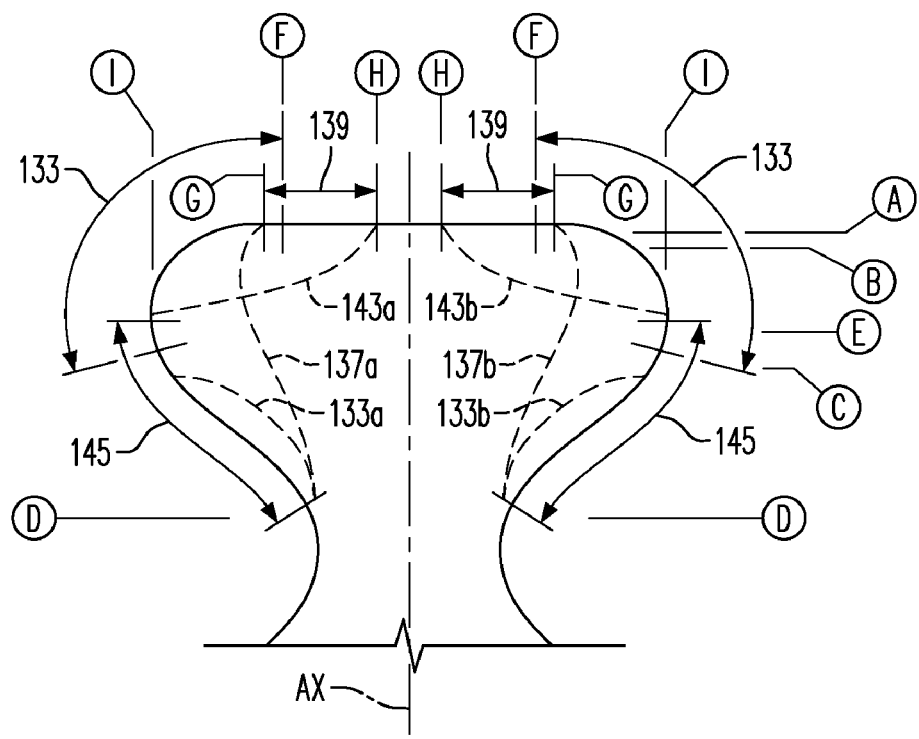
FIG. 2E is a schematic view of a shape that can be machined by a cutting tool of the type illustrated in FIGS. 2A-2D.

The flutes 123a and 123b include first leading edges 131a and 131b, respectively, defining first profiles 132a and 132b, respectively; the flutes 125a and 125b include second leading edges 137a and 137b, respectively, defining second profiles 138a and 138b, respectively; and the flutes 127a and 127b include third leading edges 143a and 143b, respectively, defining third profiles 144a and 144b, respectively. As seen in FIG. 2E, profiles or working portions of the first, second, and third leading edges form an overall shape comprising shapes 133, 139, and 145, which are portions of the overall shape. The shapes 133, 139, and 145 formed by the profiles can overlap to facilitate a clean transition from one shape portion to the next in the overall shape.

In the embodiments of FIGS. 1A-1C and 2A-2D, a portion of the leading edge, usually at least the profile of the leading edge, between a first set of two points along the longitudinal axis is disposed radially outward of a portion of another leading edge, which may include some or none of the profile of that leading edge, between the first set of two points. In the embodiment of FIGS. 2A-2D, for example, the portion of the first leading edge 131a and 131b between longitudinal point "B" and longitudinal point "C", most or all of which defines the profile 132a and 132b (FIG. 2A), is disposed radially outward of the second leading edge 137a and 137b between longitudinal points B and C. Similarly, the portion of the first leading edge 131a and 131b between longitudinal point "B" and longitudinal point "E", is disposed radially outward of the third leading edge 143a and 143b between longitudinal points B and E; the portion of the third leading edge between longitudinal points C and D is disposed radially outward of the first leading edge between longitudinal points C and D; and the third leading edge and the first leading edge between longitudinal points C and E are disposed at substantially the same radial positions relative to the axis AX. Because, over particular distances over the longitudinal axis of the tool, certain portions of certain flutes' leading edges are disposed radially outside of the leading edges of the other flutes, the radially outer leading edge portions will perform the cutting operation over those longitudinal distances.

At least a portion of the first leading edge 131a and 131b and at least a portion of the third leading edge 143a and 143b between a set of two points "H" and "F" at different radii from the longitudinal axis is disposed axially inward (i.e., in a direction away from an end of the tool 121) of a portion of the second leading edge 137a and 137b between the set of two points "H" and "F". In other words, the second leading edge 137a and 137b performs substantially the entire cutting operation between the points "H" and "F". Between radial points "F" and "G", a portion of the second leading edge 137a and 137b may overlap with a portion of the first leading edge 131a and 131b. Between radial points "G" and "I", at least a portion of the first leading edge 131a and 131b is disposed radially and axially outward of at least a portion of the third leading edge 143a and 143b such that substantially the entire cutting operation between points "G" and "I" is performed by the first leading edge. In certain locations, such as in the throat region below points "D" and "D" seen in FIG. 2E, all of the leading edges can perform a cutting operation. It will ordinarily be desirable to have some overlap between portions of profiles on successive leading edges to provide profile and shape accuracy on the workpiece.

A method of machining a workpiece 35 is described with respect to the embodiment of FIGS. 1A-1E. According to the method, a cutting tool 21 having multiple flutes 23, 25, and 27 is rotated about a longitudinal axis AX of the tool. As seen in FIGS. 1A and 1E, a first volume of material is removed from the workpiece 35 with a first leading edge 31 of a first flute 23 of the cutting tool 21, the first leading edge defining a first profile 32 relative to the longitudinal axis of the cutting tool, so as to form a first shape 33 in the workpiece. Particularly, the first profile 32 cuts away a shape 33 illustrated by "x" marks in FIG. 1E, including the vertical internal diameter 33a of the shape and a top chamfer 33b and a corner radius (not shown) at the bottom of the shape.

A second volume of material is removed from the workpiece 35 with a second leading edge 37 of a second flute 25 of the cutting tool 21, the second leading edge defining a second profile 38 relative to the longitudinal axis AX of the cutting tool, so as to form a second shape 39 in the workpiece. The first and second profiles 32 and 38 are different from each other and form different shapes 33 and 39, respectively. The second profile 38 cuts away a groove shape 39 illustrated in FIG. 1E as "+" marks.

Further portions of the overall shape to be machined from the workpiece are removed by subsequent profiles on subsequent leading edges. In the embodiment of FIGS. 1A-1C, a third volume of material is removed from the workpiece 35 with a third leading edge 43 of a third flute 27 of the cutting tool 21, the third leading edge defining a third profile 44 relative to the longitudinal axis AX of the cutting tool, so as to form a third shape 45 in the workpiece. The first, second, and third profiles 32, 38, and 44 are different from each other and form different shapes 33, 39, and 45, respectively. The third profile 44 cuts away a shape 45 illustrated by "○" marks, including chamfers 45a and 45b at the top and bottom of the groove shape 39.

In an aspect of the method, the workpiece 35 can first be machined in a direction of the longitudinal axis AX of the cutting tool 21. Subsequently, the workpiece 35 can be machine in at least one direction transverse to the longitudinal axis AX of the cutting tool. In this way, a workpiece 35 can be easily machined to provide shapes such as a chamfered groove in the workpiece.

Figure 3A:
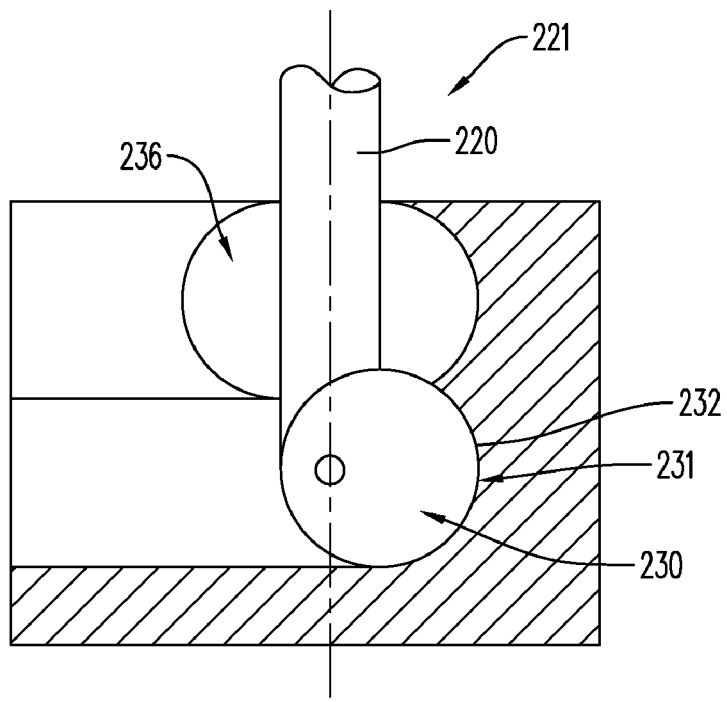
FIGS. 3A and 3B are side views of a cutting tool with replaceable cutting inserts in different rotational positions according to another embodiment of the present invention.
Figure 3B:
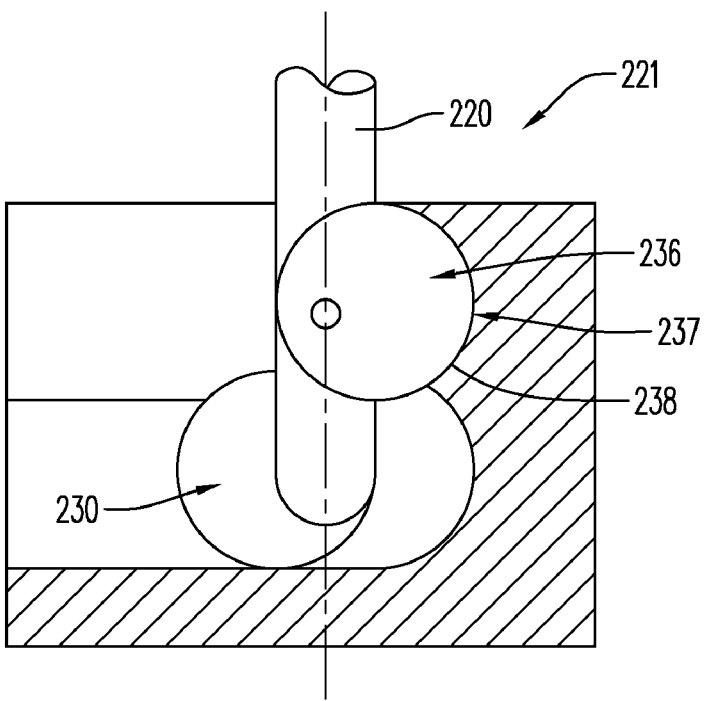

The cutting tool 21 and 121 illustrated in FIGS. 1A-1C and 2A-2D is a one-piece tool. As seen in FIGS. 3A and 3B, however, it will be appreciated that other embodiments can use replaceable cutting inserts 230 and 236 mounted on a toolholder 220 to form some or all of the multiple profiles to be provided on a cutting tool 221. In the illustrated embodiment, the first leading edge 231 is formed by a first cutting insert 230 and a second leading edge 237 is formed by a second cutting insert 236. The inserts 230 and 236 overlap longitudinally and the leading edges 231 and 237 define profiles 232 and 238, respectively. The inserts 230 and 236 are illustrated as circular inserts, however, any desired insert shape can be provided. The inserts may be indexable to permit different portions of the insert to be used as the working cutting edge.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A one-piece cutting tool having multiple flutes, comprising a tool body having a longitudinal axis, wherein a first flute is provided in the body and comprises a first leading edge that defines a first profile when rotated about the longitudinal axis, and a second flute is provided in the body and comprises a second leading edge that defines a second profile when rotated about the longitudinal axis, the first and second profiles being different from each other and being adapted to cut a workpiece in succession , wherein a portion of the first profile is non-parallel to any portion of the second profile.

2. The one-piece cutting tool as set forth in claim 1, wherein the tool comprises a second first flute and a second second flute.

3. The one-piece cutting tool as set forth in claim 1, wherein a portion of the first leading edge between a first set of two points along the longitudinal axis is disposed radially outward of a portion of the second leading edge between the first set of two points.

4. The one-piece cutting tool as set forth in claim 1, wherein at least a portion of the first leading edge between a first set of two points at different radii from the longitudinal axis is disposed axially inward of a portion of the second leading edge between the first set of two points.

5. The one-piece cutting tool as set forth in claim 4, wherein at least a portion of the first leading edge between a second set of two points along the longitudinal axis is disposed radially outward of a portion of the second leading edge between the second set of two points.

6. The one-piece cutting tool as set forth in claim 1, wherein the tool comprises a third flute provided in the body and comprises a third leading edge that defines a third profile when rotated about the longitudinal axis, the first, second, and third profiles being different from each other.

7. The one-piece cutting tool as set forth in claim 6, wherein the tool comprises a second first flute, a second second flute, and a second third flute.

8. The one-piece cutting tool as set forth in claim 6, wherein the first flute, the second flute, and the third flute are configured such that, when the cutting tool is rotated relative to a workpiece to machine the workpiece, cutting forces on the first flute, the second flute, and the third flute are approximately equal.

9. The one-piece cutting tool as set forth in claim 6, wherein a portion of the first leading edge between two points along the longitudinal axis is disposed radially outward of a portion of the second leading edge and a portion of the third leading edge between those two points.

10. The one-piece cutting tool as set forth in claim 6, wherein at least a portion of the first leading edge and at least a portion of the third leading edge between a first set of two points at different radii from the longitudinal axis are disposed axially inward of a portion of the second leading edge between the first set of two points.

11. The one-piece cutting tool as set forth in claim 10, wherein a portion of the first leading edge between a second set of two points along the longitudinal axis is disposed radially outward of a portion of the second leading edge and a portion of the third leading edge between the second set of two points.

12. The one-piece cutting tool as set forth in claim 6, wherein the third leading edge extends an entire length of the third flute.

13. The one-piece cutting tool as set forth in claim 12, wherein the first, second, and third flutes each extend to an end of the tool.

14. The one-piece cutting tool as set forth in claim 1, wherein the first flute and the second flute are configured such that, when the cutting tool is rotated relative to a workpiece to machine the workpiece, cutting forces on the first flute and the second flute are approximately equal.

15. The one-piece cutting tool as set forth in claim 1, wherein the first flute and the second flute comprise flute surfaces that are substantially parallel to the longitudinal axis.

16. The one-piece cutting tool as set forth in claim 1, wherein the first flute and the second flute are helical.

17. The one-piece cutting tool as set forth in claim 1, wherein the first leading edge extends an entire length of the first flute, and the second leading edge extends an entire length of the second flute.

18. The one-piece cutting tool as set forth in claim 17, wherein the first and second flutes each extend to an end of the tool.

19. The one-piece cutting tool as set forth in claim 1, wherein the first and second flutes each extend to an end of the tool.

20. The one-piece cutting tool as set forth in claim 1, wherein different portions of the first leading edge are disposed at different radii from the longitudinal axis and different portions of the second leading edges are disposed at different radii from the longitudinal axis.

21. A one-piece cutting tool having multiple flutes, comprising a tool body having a longitudinal axis, wherein a first flute is provided in the body and comprises a first leading edge that defines a first profile when rotated about the longitudinal axis, and a second flute is provided in the body and comprises a second leading edge that defines a second profile when rotated about the longitudinal axis, the first and second profiles being different from each other and being adapted to cut a workpiece in succession, wherein the tool comprises a third flute provided in the body and comprises a third leading edge that defines a third profile when rotated about the longitudinal axis, the first, second, and third profiles being different from each other, at least a portion of the first leading edge and at least a portion of the third leading edge between a first set of two points at different radii from the longitudinal axis are disposed axially inward of a portion of the second leading edge between the first set of two points, a portion of the first leading edge between a second set of two points along the longitudinal axis is disposed radially outward of a portion of the second leading edge and a portion of the third leading edge between the second set of two points, and a portion of the third leading edge between a third set of two points along the longitudinal axis is disposed radially outward of a portion of the second leading edge and a portion of the first leading edge between the third set of two points.

\* \* \* \* \*